Aug. 19, 1941.   F. PORSCHE   2,252,860
BRAKE MECHANISM FOR VEHICLE ROAD WHEELS
Filed Jan. 19, 1940
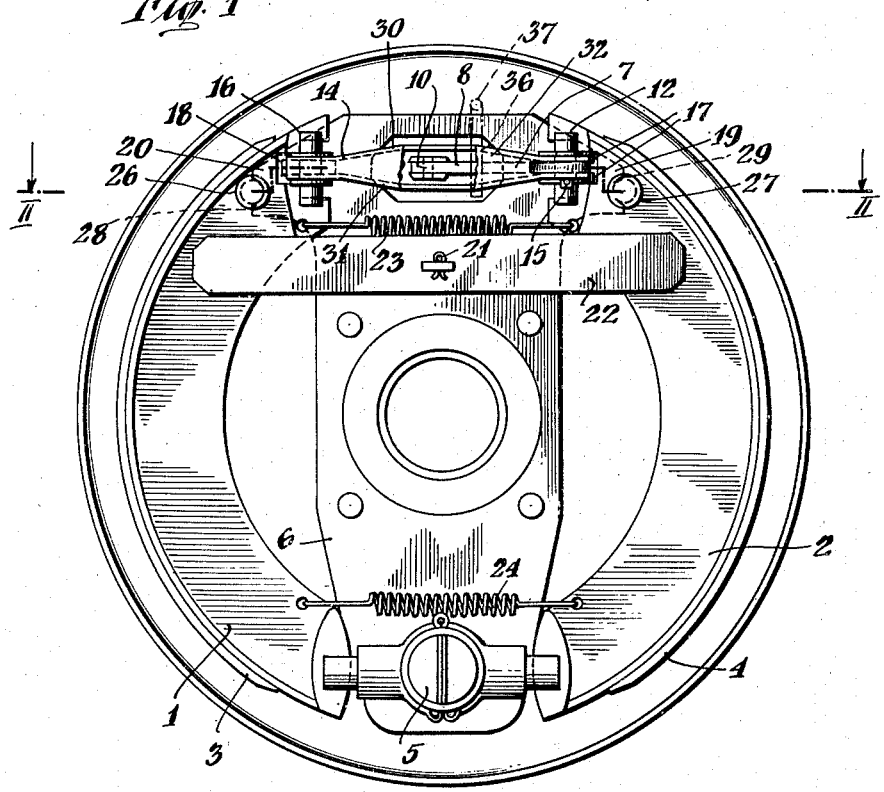
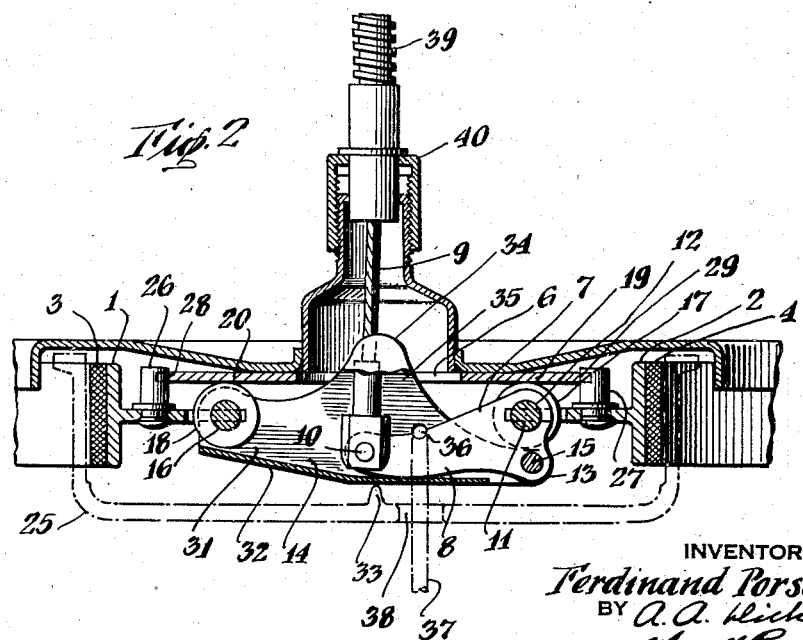
INVENTOR
Ferdinand Porsche
BY
ATTORNEYS Patented Aug. 19, 1941

2,252,860

UNITED STATES PATENT OFFICE 2,252,860

BRAKE MECHANISM FOR VEHICLE ROAD WHEELS

Ferdinand Porsche, Stuttgart, Germany, assignor to Dr. Ing. h. c. F. Porsche K.-G., Stuttgart Zuffenhausen, Germany, a company of Germany Application January 19, 1940, Serial No. 314,586
In Germany July 13, 1939

13 Claims. (Cl. 188—196)

The present invention relates to improvements in brake mechanism for vehicle road wheels.

It is an object of the present invention to provide a brake mechanism which may be readily adjusted.

To that end it is an object to provide means for temporarily holding the brake operating members in a definite position so that the means for operating the brake operating element, such as a cable connected for operation by the foot pedal, may be conveniently connected up.

It is another object of the invention to provide a temporary holding means so constructed and arranged that it is impossible to place the vehicle in driving condition without first removing the temporary holding means. In this way, accidents are avoided which might otherwise occur due to inability to apply the brakes.

It is another object of the invention to improve generally brake means for power vehicles.

Other objects will appear from the following description of an illustrative embodiment of the invention taken together with the attached drawing wherein:

Fig. 1 of said drawing illustrates in elevation one form the invention may take, the brake drum having been removed; and Fig. 2 is a horizontal cross-section of the brake mechanism taken along the line II—II of Fig. 1.

As shown in the drawing, the brake is provided with two brake shoes 1 and 2, provided with brake linings 3 and 4, respectively. The lower ends of the brake shoes bear upon and are guided by supports 5 carried by the brake plate 6, whereas, the upper end cooperates with an arrangement for spreading the brake shoes and thereby causing application of the brake. This occurs by means of an angle lever 7 to arm 8 of which a cable 9 for operating the brake is connected by means of a pivot bolt 10. The lever 7 is pivoted by bolt 12 to the brake shoe 2 at the point 11 and its other arm 13 is connected with brake shoe 1 by means of the link or strut 14 by means of the pivot bolts 15 and 16.

For this purpose, rollers 17 and 18 are preferably provided upon the pivot bolts 12 and 16, which bolts have notches which receive a race formed upon the projections 19 and 20 of the brake plate 6, thereby providing guide means not only for the upper end of the brake shoes 1 and 2 but also for the angle lever 7 and the connecting strut 14. Preferably a leaf spring 22 held in place for example by means of the cotter pin 21, serves also to assure a definite location of the brake shoes. Retracting springs 23 and 24 assure that after brake operation the brake shoes 1 and 2 will be withdrawn from contact with the brake drum (shown in dotted lines at 25) into the brake released position.

The brake shoes are located in a definite position by means of the bolts 26 and 27 carried by the shoes 1 and 2, respectively, which bear into V-shaped notches 28 and 29 upon the brake plate 6.

The connecting strut 14 is shown as having a U-formed cross-section between whose side walls 30, 31, the arm 8 of the angle lever 7 lies. In brake released position, this arm may come to rest against the web 32 of the strut 14 as appears in Fig. 2. By means of this construction it is possible to eliminate the danger that by stretching of the operating cable 9 the arm 8 might collide with the brake drum 25, or even prevent its rotation if it is provided with ribs such as indicated at 33.

The two side pieces 30 and 31 of the strut 14 are provided with extensions 34, 35 which cover substantially the path traveled by the pivot bolt 10, serving for connection with the tension cable 9, during actuation of the brake. Therefore, the connecting bolt 10 during assembly of the parts is merely pushed into place and thereupon when the arm 8 is swung back between the side pieces 30 and 31 and their extensions 34, 35, the bolt is locked against falling out.

In order to assure convenient adjustment of the operating cable 9, the strut 14 is provided in its side walls 30 and 31 with a hole 36 generally parallel to the various pivot bolts and the arm 8 of the angle lever 7 is so formed that if a member, such as the locking bolt 37 shown in dotted lines in Figs. 1 and 2, is inserted through said opening, the angle lever 7 is held in its ineffective position (due to the engagement of the bolt 37 therewith or with a recess therein as shown) and the brake shoes 1 and 2 are locked against operation. The adjustment of the tension cable 9 may now be readily effected as by adjusting the position of its sheath 39 relative to the cable 9 by adjusting the nut 40.

The locking bolt is preferably formed as an arm of an L-shaped member consisting of a round rod or wire. The locking bolt may be inserted, assuming that the brake drum 25 is in place, by pushing it through a closable opening 38 in the brake drum and one of its ends inserted into the bore 36 of the strut link as is shown in dotted lines. It will be noted that the holding bolt is so constructed that in the event its removal is forgotten, it will be impossible to assemble the wheel upon the hub, whereby the utilization of the vehicle with ineffective brakes is prevented.

The expression "angle lever" as applied to the lever 7 is not to be understood as restricting it to the form shown, and it is therefore pointed out that the angle between the arm to which the cable is attached and the operating arm may be anywhere from 0° to 180°.

It is furthermore to be understood that instead of an operating cable an operating linkage of any type might be employed.

It will be noted that the brake shoe spreading members are arranged for movement in a plane which is generally parallel to the axis of the road wheel. This has the desirable effect that the operating connection, such as the cable 9, may extend generally parallel to said axis, a most desirable construction.

Having described an illustrative embodiment of the invention, it is pointed out that various changes and modifications therein may be made without departing from the invention as set forth in the following claims.

I claim:

1. In brake mechanism, at least one brake shoe, operating means therefor, connecting means for actuating said operating means and means for temporarily locking said operating means in a fixed position, whereby said connecting means may be readily adjusted.

2. In brake mechanism, at least one brake shoe, operating means therefor, connecting means for actuating said operating means and means for temporarily locking said operating means in a fixed position, whereby said connecting means may be readily adjusted, said temporary locking means being so constructed and arranged that the road wheel may not be assembled in place when the locking means is effective.

3. In brake mechanism, at least one brake shoe, operating means therefor, connecting means for actuating said operating means and means for temporarily locking said operating means in a fixed position, whereby said connecting means may be readily adjusted, said temporary locking means comprising a bolt passing through elements of said operating means and having an extension which extends outwardly and prevents the assembly of the road wheel, whereby the wheel may not be assembled and the vehicle operated when the locking bolt is in effective position.

4. In brake mechanism, a pair of brake shoes, spreading means therefor, connecting means for actuating said spreading means and means for temporarily locking said spreading means in ineffective position, whereby said connecting means may be readily adjusted.

5. In brake mechanism, a pair of brake shoes, spreading means therefor, connecting means for actuating said spreading means and means for temporarily locking said spreading means in ineffective position, whereby said connecting means may be readily adjusted, said temporary locking means being so constructed and arranged that the road wheel may not be assembled in place when the locking means is effective.

6. In brake mechanism, a pair of brake shoes, spreading means therefor, connecting means for actuating said spreading means comprising a lever bearing against one of said brake shoes and a strut bearing against said lever and against the other brake shoe and means for temporarily locking said spreading means in a fixed position comprising a bolt passing through said lever and said strut, whereby said connecting means may be readily adjusted.

7. In brake mechanism, a pair of brake shoes, spreading means therefor, connecting means for actuating said spreading means comprising a lever bearing against one of said brake shoes and a strut bearing against said lever and against the other brake shoe and means for temporarily locking said spreading means in a fixed position comprising a bolt passing through said lever and said strut, whereby said connecting means may be readily adjusted, said bolt being formed with an extension which serves to prevent operation of the vehicle when said bolt is in position.

8. In brake mechanism, a pair of brake shoes, spreading means therefor, connecting means for actuating said spreading means comprising a lever bearing against one of said brake shoes and a U-shaped strut bearing against said lever and against the other brake shoe and serving to receive said lever between its walls, means for attaching said connecting means to said lever including a bolt, said strut being so formed that said bolt is located between said walls in all positions of said lever so that the bolt is held in place thereby.

9. In brake mechanism, a pair of brake shoes, spreading means therefor, connecting means for actuating said spreading means comprising a lever bearing against one of said brake shoes and a U-shaped strut bearing against said lever and against the other brake shoe and serving to receive said lever between its walls, means for attaching said connecting means to said lever including a bolt, said strut being so formed that said bolt is located between said walls in all positions of said lever so that the bolt is held in place thereby, and means for temporarily locking said spreading means in a fixed position comprising a locking bolt passing through said lever and the walls of said strut, whereby said connecting means may be readily adjusted.

10. In brake mechanism, a pair of brake shoes, spreading means therefor, connecting means for actuating said spreading means comprising a lever bearing against one of said brake shoes and a U-shaped strut bearing against said lever and against the other brake shoe and serving to receive said lever between its walls, the strut and lever being so formed that the connecting web of said U-shaped section serves to limit movement of the lever relative to the strut toward the brake released position.

11. In brake mechanism, a pair of brake shoes, spreading means therefor, connecting means for actuating said spreading means comprising a lever bearing against one of said brake shoes and a U-shaped strut bearing against said lever and against the other brake shoe and serving to receive said lever between its walls, the strut and lever being so formed that the connecting web of said U-shaped section serves to limit movement of the lever relative to the strut toward the brake released position; and means for temporarily locking said lever in brake released position whereby said connecting means may be readily adjusted.

12. In brake mechanism, a pair of brake shoes, spreading means therefor, connecting means for actuating said spreading means comprising a lever bearing against one of said brake shoes and a U-shaped strut bearing against said lever and against the other brake shoe and serving to receive said lever between its walls, the strut and lever being so formed that the connecting web of said U-shaped section serves to limit movement of the lever relative to the strut toward the brake released position, and means for temporarily locking said lever in brake released position whereby said connecting means may be readily adjusted, said temporary locking means comprising a bolt passing through said lever and through the side walls of said strut.

13. In brake mechanism, a pair of brake shoes, spreading means therefor, connecting means for actuating said spreading means comprising a lever bearing against one of said brake shoes and a U-shaped strut bearing against said lever and against the other brake shoe and serving to receive said lever between its walls, the strut and lever being so formed that the connecting web of said U-shaped section serves to limit movement of the lever relative to the strut toward the brake released position, and means for temporarily locking said lever in brake released position whereby said connecting means may be readily adjusted, said temporary locking means comprising a bolt passing through said lever and through the side walls of said strut and having an extension which extends outwardly and prevents the assembly of the road wheel.

FERDINAND PORSCHE.